United States Patent [19]

Shiratsuchi

[11] 4,413,700
[45] Nov. 8, 1983

[54] SEAT MOUNTING STRUCTURE FOR MOTORCYCLES AND ASSOCIATED METHODS

[75] Inventor: Koji Shiratsuchi, Asaka, Japan

[73] Assignee: Honda Giken Kogyo Kabushiki Kaisha, Tokyo, Japan

[21] Appl. No.: 303,074

[22] Filed: Sep. 17, 1981

[30] Foreign Application Priority Data

Sep. 17, 1980 [JP] Japan .................. 55/128003
Sep. 17, 1980 [JP] Japan .................. 55/131214[U]
Sep. 17, 1980 [JP] Japan .................. 55/131215[U]
Sep. 17, 1980 [JP] Japan .................. 55/131223[U]

[51] Int. Cl.³ ............................ B62J 1/04; B62J 17/00
[52] U.S. Cl. .................. 180/219; 280/289 R; 280/289 A; 280/289 S; 296/78.1; 297/193; 297/243
[58] Field of Search ............... 180/219, 227, 228, 229, 180/231; 280/289 S, 289 R, 289 A, 289 G, 289 E; 296/78.1; 297/195, 193, 243

[56] References Cited

U.S. PATENT DOCUMENTS 2,330,341 9/1943 DuPont et al. ............... 180/219
3,779,597 12/1973 Uchida .......................... 297/195
3,927,727 12/1975 Hanagan ...................... 180/219
3,963,227 6/1976 Mölders ......................... 296/56
4,171,731 10/1979 Hilber ............................ 180/219

Primary Examiner—Joseph F. Peters, Jr.
Assistant Examiner—Donn McGiehan
Attorney, Agent, or Firm—Posnack, Roberts, Cohen & Spiecens

[57] ABSTRACT

A motorcycle having a frame with front and rear wheels thereon, and an engine supported between the wheels. A driver's seat is mounted on the frame between the engine and above the rear wheels. The seat is supported by a hinge connection to the frame to be movable between a raised position lin which equipment located under the seat is accessible and a lowered driving position. A resilient member, such as a fluid damper, is connected between the seat and the frame so as to be energized when the seat is lowered and to apply lift force to the seat in a subsequent opening operation. The hinge connection is movable between a forward and a rearward position, and in the forward position the seat is held in its lowered position, whereas when the hinge connection is moved to the rearward position, it is released for being moved to its raised position. A grip member is secured to the seat and to a depending cover thereon and supports elements of the releasable holding system of the seat with the frame.

33 Claims, 15 Drawing Figures

SEAT MOUNTING STRUCTURE FOR MOTORCYCLES AND ASSOCIATED METHODS

FIELD OF THE INVENTION

The invention relates to a seat system for a driver of a motorcycle or other two-wheeled vehicles, to associated structure of the motorcycle, and to associated methods.

PRIOR ART

Motorcycle construction is known in which the seat for a driver is mounted on the top of a frame between the front and rear wheels adjacent the engine for pivotable movement between a raised inoperative position and a lowered operative position. In the raised inoperative position, various parts of the engine and ancillary equipment are accessible.

SUMMARY OF THE INVENTION

An object of the invention is to provide a seat construction of the above type which is facilitated in its opening operation and which will be held in its open position.

Another object of the invention is to secure a cover to the seat so that the cover moves with the seat to the opened position thereby obviating the need for separate removal of the cover from the frame as in the art.

A further object of the invention is to provide a grip member which employs means for securing the grip member to the cover and for releasably engaging the motorcycle frame to hold the seat in its lowered operative position.

Another object of the invention is to provide locking means between said grip member and said frame independently of the holding of the seat by the engagement of the grip member and the frame.

Another object of the invention is to provide a construction for the grip member which will enable the grip member to hold a helmet thereon in secured condition when the grip member is locked to the frame and in removable condition when the grip member is unlocked from the frame.

A further object of the invention is to provide a cover in front of the seat to close a space formed by a front fairing and thereby prevent air in said space from directly flowing towards the driver.

Yet another object of the invention is to provide integral, forwardly projecting extensions on said seat which flank a fuel tank in front of the seat and provide flexible support means for the knees of the driver.

The above and further objects of the invention are satisfied by a construction in which the seat is connected to the frame by a coupling means which provides pivotal movement of the seat between a raised inoperative position and a lowered operative position and resilient means for urging the seat to the raised position.

In accordance with a feature of the invention, the coupling means comprises a movable hinge having a hinge pin which is movable in a slot between forward and rearward positions. In the forward position of the movable hinge, the seat is held by a releasable holding means in its lowered position. By moving the seat rearwardly to the rearward position of the movable hinge, the seat is released from the holding means and is movable to its raised position with the assistance of the resilient means.

In further accordance with the invention, a depending cover is secured to the seat and travels therewith between the raised and lowered positions. A grip means is attached to the seat and to the cover and supports operative elements of the releasable holding means. The grip means carries a lock means for selectively locking the seat to the frame when the seat is in its lowered position. The grip means is provided with an arm carrying the lock means which is capable of pivotal movement and is dimensioned and proportioned to hold a helmet thereon.

In further accordance with the invention, a head cover is provided in front of the seat to cover a space and thereby prevent air in said space from flowing upwardly through the open top to a driver on the seat.

In further accordance with the invention, the seat includes forwardly projecting extensions at opposite ends thereof for flanking the fuel tank in front of the seat to serve as means for support of the knees of the driver.

The invention further contemplates a method of operating the seat of a motorcycle to lift the seat to the open position to gain access to equipment beneath the seat and to lower the seat to its operative position. The method comprises displacing the seat rearwardly to a release position in which the seat can be lifted to open position and applying force from an energized member to the seat to lift the seat when it is in the release position. Said member is energized by the lowering of the seat from its opened position and after the seat has reached its lowered position, it is displaced forwardly to be held in said lowered position with said member energized and in readiness to apply lift force to the seat in a subsequent opening operation.

In further accordance with the method of the invention, the energizing of said member comprises compressing a fluid.

The method of the invention further comprises locking the seat in the lowered position after the seat has been moved forwardly and is held in the lowered position.

In further accordance with the method of the invention, a helmet is secured to the seat upon locking of said seat.

In further accordance with the method of the invention, knee supports are provided on the seat which flank a fuel tank in front of the seat when the seat is lowered and moved forwardly thereby blocking contact of the knees of the driver with the fuel tank.

Further features and objects of the invention will become evident to those skilled in the art from a consideration of the particular embodiments of the invention to be described hereafter in conjunction with the attached drawings.

BRIEF DESCRIPTION OF THE VIEW OF THE DRAWINGS

Figure 14:
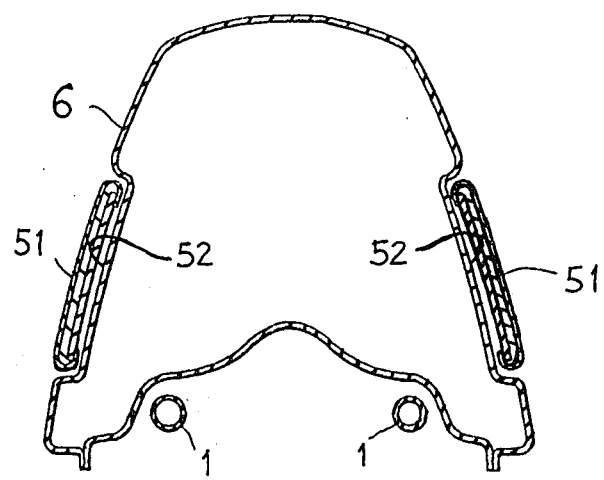
FIG. 14 is a sectional view taken on line XIV—XIV in FIG. 1.
Figure 15:
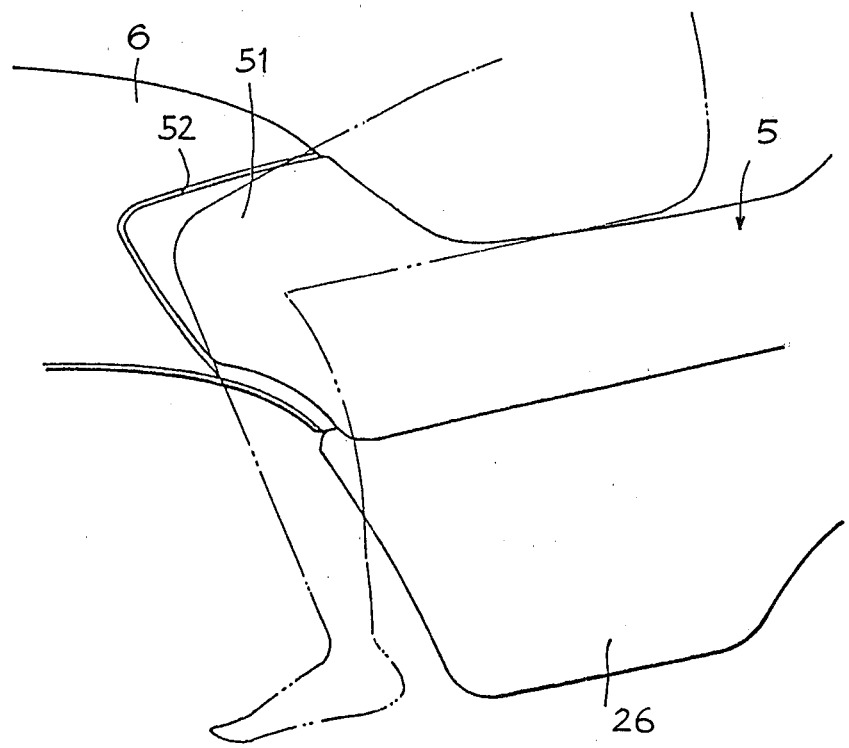

FIG. 15 diagrammatically illustrates the structure in FIG. 14 showing its mode of use.

DETAILED DESCRIPTION

In the drawing is seen a motorcycle which comprises a body or frame 1 having a front wheel 2 and a rear wheel 3. An engine 4 is supported on the frame 1 between the front and rear wheels. A seat 5 is supported on frame 1 behind the engine in a manner to be discussed in detail later. A fuel tank 6 is mounted on the frame above the engine and in front of seat 5. The fuel tank has a filler cap 6a. The engine is provided with a supercharger 7 and a radiator 8 in front of the engine. The frame includes a head pipe 9 at the top of which a pair of left and right handle pipes 10 project. A front fairing 11 is secured to the frame and extends laterally along opposite sides of the motorcycle to cover the head pipe, radiator and supercharger.

Figure 1:
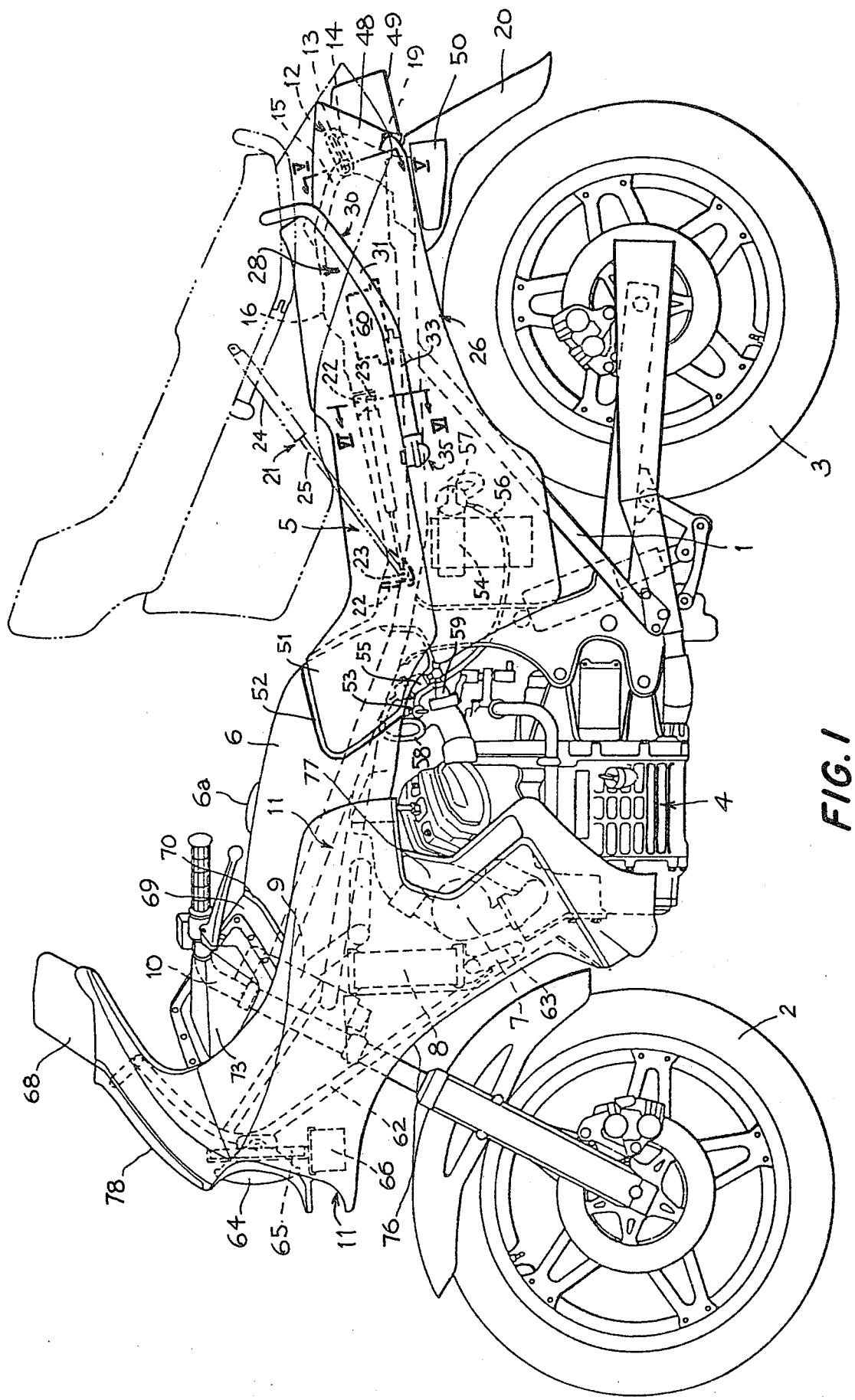
FIG. 1 is a side elevational view of a motorcycle provided with equipment according to the invention.

The seat 5 is pivotably mounted by a hinge mechanism 12 on the frame so that the seat 5 can be moved between a lowered operative position as shown in solid lines in FIG. 1 and a raised inoperative position as shown in chain-dotted lines in FIG. 1. The hinge mechanism 12 comprises a movable hinge pin 13 which can travel in slots 14 between forward and rearward positions. The hinge pin 13 is affixed to an arm 15 secured to a plate 16 fixedly attached to the bottom of seat 5 by suitable fasteners 17. The slots 14 are formed in upstanding legs 18 of a U-shaped bracket 19 which is secured to a fender 20 fixed to frame 1.

A fluid damper 21 is connected at its opposite ends to the bottom of seat 5 and the frame 1. Each of the connections at the ends of the damper 21 comprises a bracket 22 and a pin 23 supported in the bracket. The fluid damper 21 essentially functions as a resilient means urging the seat 5 to its open position and for this purpose can be constructed as a telescoping pneumatic cylinder including a cylinder member 24 and a piston member 25 slidably mounted in the cylinder member to form an air chamber therein. When the seat is lowered, the air chamber is pressurized so that, if the seat is subsequently released, the damper 21 will move the seat to its raised position by expansion of the air in the air chamber. The damper will extend to a pre-determined length to hold the seat in open position. The damper 21 is effective to facilitate the manual operation of opening the seat and to hold the seat open when the region beneath the seat is inspected, as will be explained later. Although the means for urging the seat to open position and for holding the seat in this position has been described in relation to the fluid damper, other embodiments are possible, such as springs, hydraulic cylinders and the like.

Figure 2:
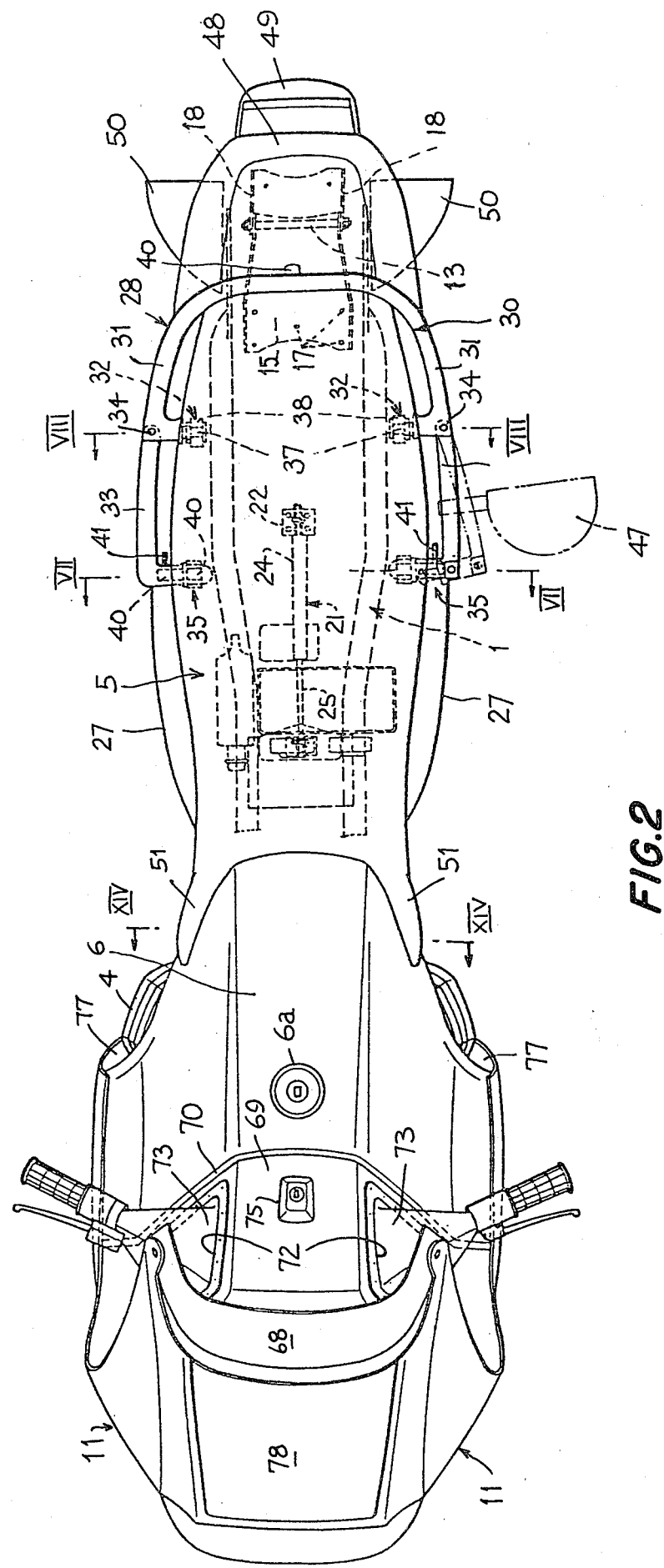
FIG. 2 is a top plan view thereof.
Figure 3:
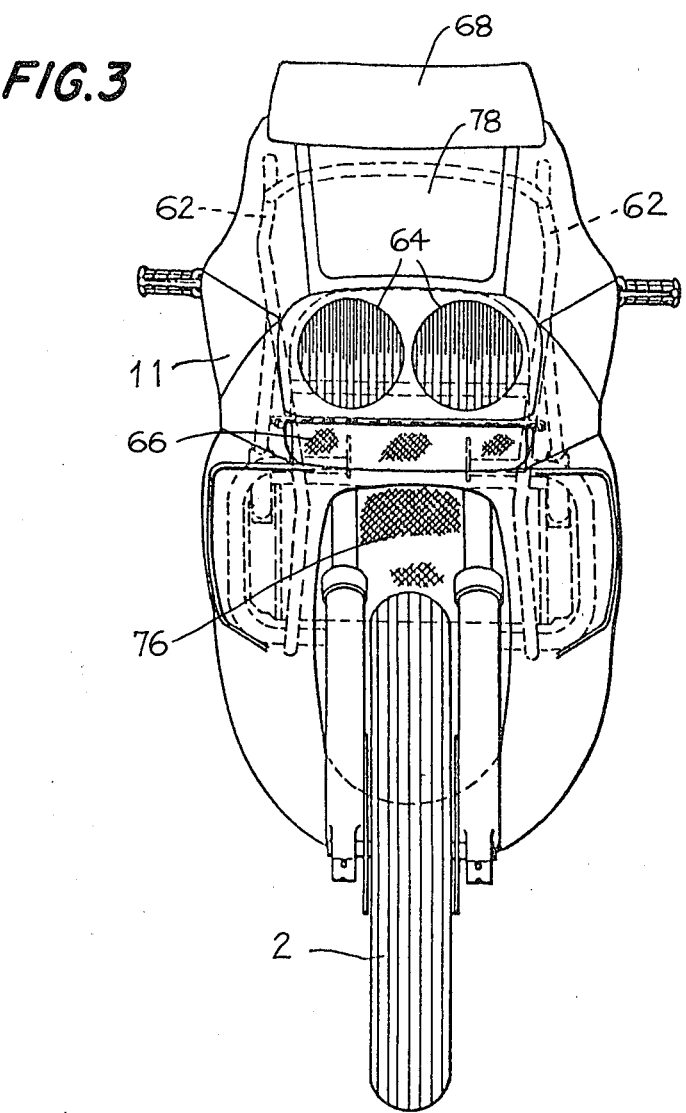
FIG. 3 is a front view thereof.
Figure 5:
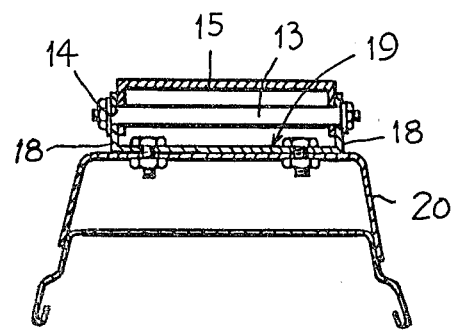
FIG. 5 is a sectional view taken on line V—V in FIG. 1.
Figure 4:
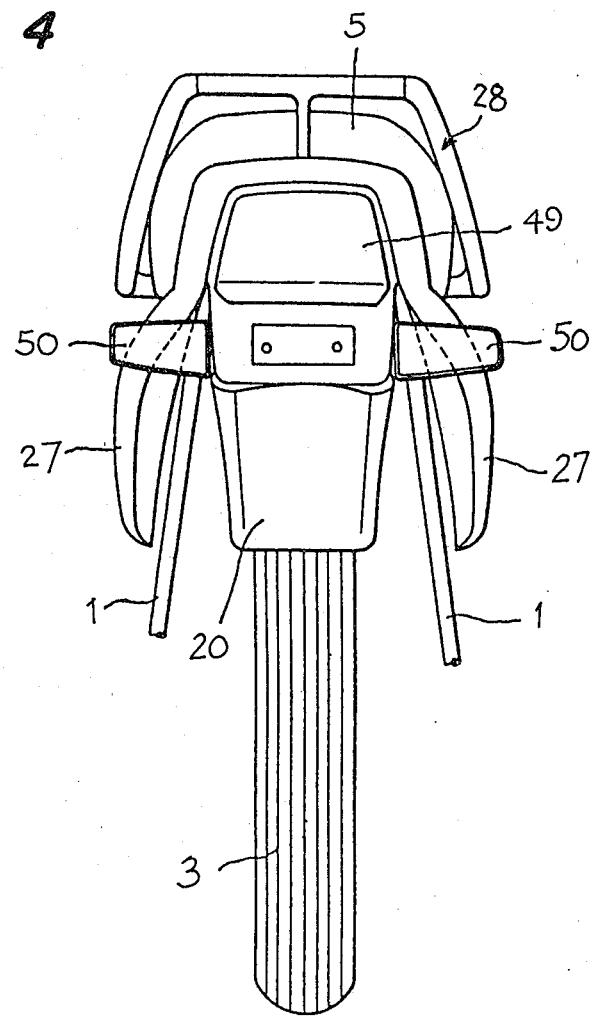
FIG. 4 is a rear view thereof.
Figure 6:
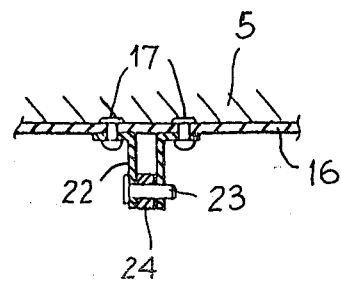
FIG. 6 is a sectional view taken on line VI—VI in FIG. 1.

Attached to the bottom of the seat 5 is a cover 26 which includes side walls 27 which serve to cover opposite lateral sides of the frame 1. The cover 26 moves with the seat 5 in its opening and closing movements. Also attached to seat 5 is a rear grip member 28 including a rear portion of U-shape 30 encircling the seat at its rear end and provided with opposite arms 31 extending along opposite sides of seat 5. The rear portion 30 of grip member 28 is provided with a releasable holding system 32 at each of the forward ends of arms 31 by which the grip member 28 is held by the frame when the seat is in its lowered position. The grip member 28 further comprises lock arms 33 pivotably connected to arms 31 at pivot pins 34 for lateral movement towards and away from frame 1 as evident from FIG. 2 which shows the arms 33 in solid lines in inward locked position and in chain-dotted lines in outward open position. A locking mechanism 35 is located at the free, forward ends of arms 33 for locking the arms 33 and thereby the grip member and seat with the frame.

Figure 8:
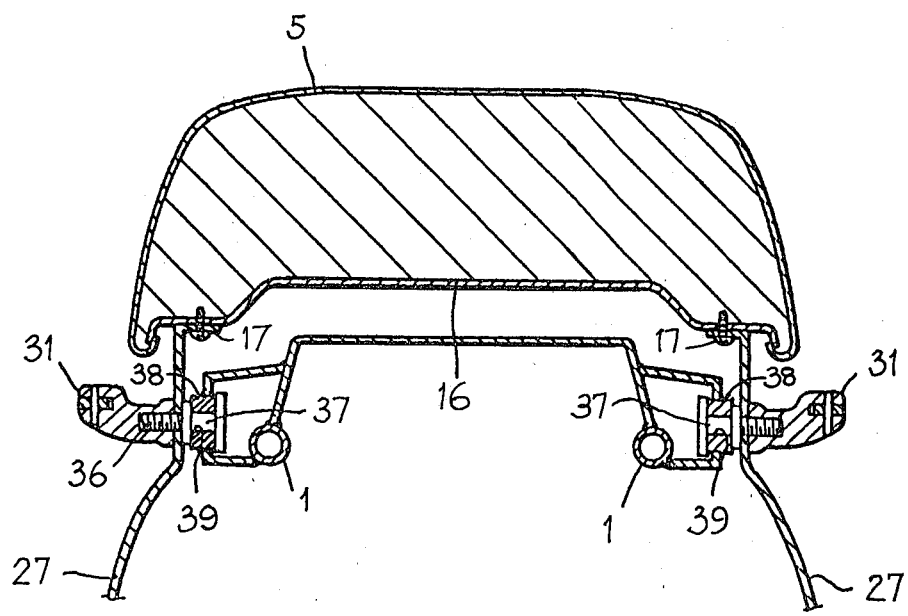
FIG. 8 is a sectional view taken on line VIII—VIII in FIG. 2.
Figure 10:
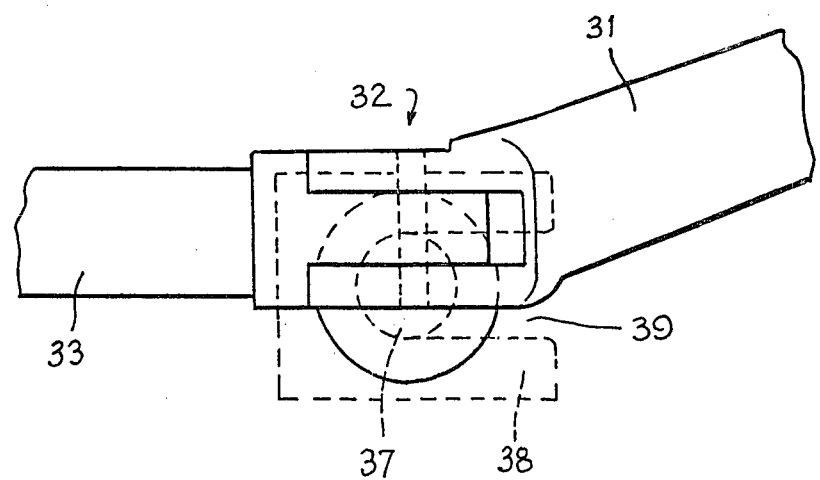
FIG. 10 is a side view on enlarged scale of the structure illustrated in FIG. 8.
Figure 11:
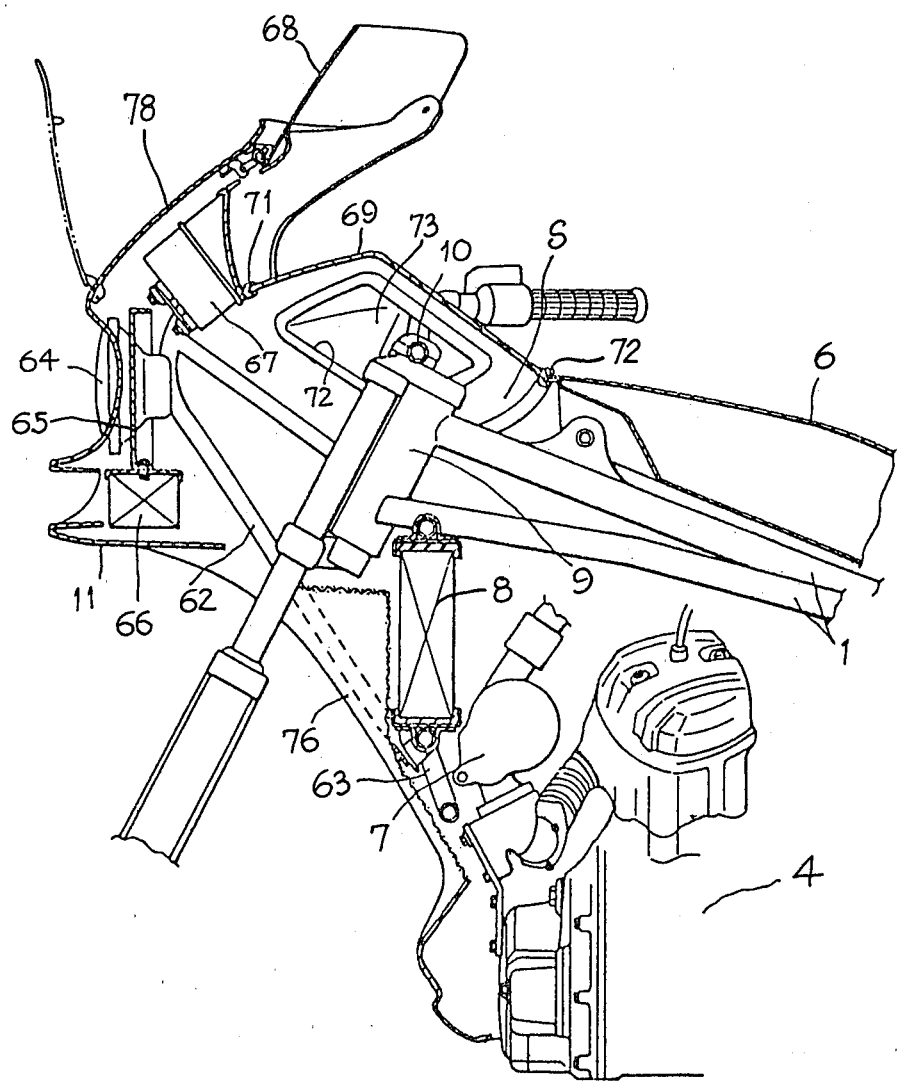
FIG. 11 is a side elevational view, partly broken away in section, of a front portion of the motorcycle.

The releasable holding mechanism 32 will now be described in detail with particular reference to FIGS. 8 and 10. The arms 31 of grip member 28 are attached by respective bolts 36 to side walls 27 of cover 26, and pins 37 are integrally formed with bolts 36 and extend inwardly thereof. A receiver member 38 is fixed to frame 1 at each side of the frame and is provided with a rearwardly open groove 39 for slidably receiving a respective pin 37 whereby the grip member 28 is releasably held by the frame. The length of groove 39 is less than the travel of pin 13 in slots 14 of the movable hinge 12, such that in order to raise the seat, the grip member 28 is moved rearwardly with the seat to cause pins 37 to escape from grooves 39 whereupon the fluid damper will urge the seat to its open position by pivotal movement around pin 13. The grip member 28 is further secured to the seat by means of a bracket 40 which is affixed to the grip member 28 at the back of rear portion 30 and to arm 15. By means of the attachment of the grip member to the frame via the holding mechanism 32 and bracket 40 a rigid and secure engagement means is provided despite the fact that the cover is ordinarily constructed of thin, lightweight material.

Figure 7:
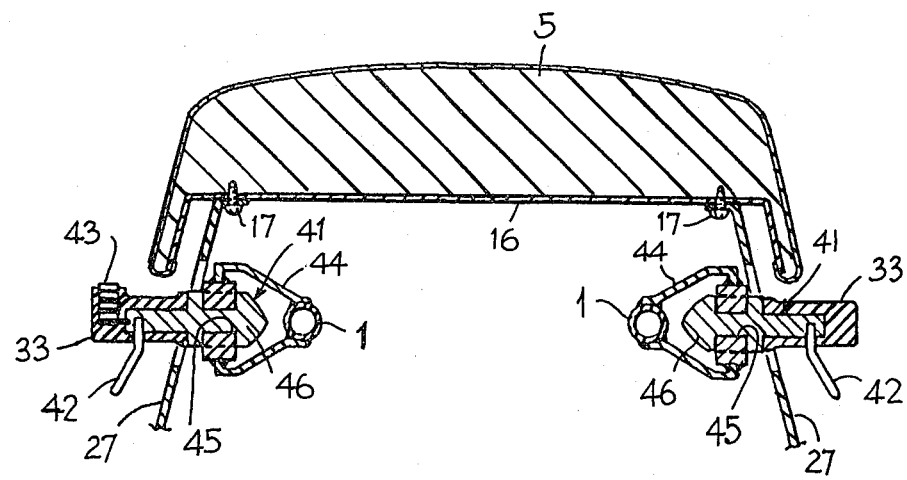
FIG. 7 is a sectional view taken on line VII—VII in FIG. 2.
Figure 9:
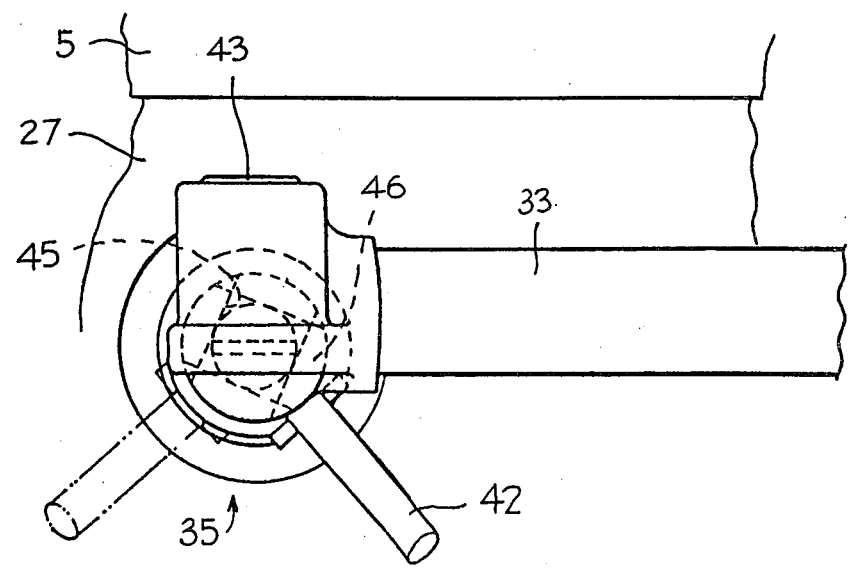
FIG. 9 is a side view on enlarged scale of the structure illustrated in FIG. 7.

The locking mechanism 35 will now be described in detail with reference to FIGS. 7 and 9. The locking mechanism 35 on each pivotal arm 33 of the grip member comprises an inwardly projecting engaging member 41 which is mounted in the arm 33 for turnable movement by an activating lever 42 fixed at one end of member 41. Member 41 is movable between the locked position as shown in FIGS. 7 and 9 and an unlocked position in which the member 41 is rotated 90° clockwise as shown by the chain-dotted position of lever 42 in FIG. 9. In order to effect locking of member 41 in its locked position, a cylinder lock 43 or other suitable locking means is mounted on at least one arm 33 to block rotation of the member 41, unless the lock 43 is released. The member 41 is engageable with a receiver 44 fixed to frame 1 in order to lock the locking mechanism. The receiver 44 is provided with an elongated slot 45 and engaging member 41 has an enlarged end or flange 46 which can pass through slot 45 in the angular, unlocked position of member 41 and which becomes locked in the receiver 44 behind slot 45 when the engaging member is turned to its locked position. The arm 33 whose locking mechanism 35 is provided with the lock 43 is dimensioned and proportioned such that in the outward, open position of the arm 33, a helmet 47 can be freely introduced on or removed from the arm 33. Thus, when a helmet is placed on the arm 33 and the arm is locked by lock 43, the helmet is secured to the arm 33. The helmet is released by unlocking arm 33 and pivoting the arm to open position. The length of arm 33 is sufficient to permit a plurality of helmets to be locked on the arm.

The operation of raising or lowering the seat is as follows assuming the seat is in its raised position and it is desired to lower and lock the seat. The grip member 28 is engaged and utilized to apply force to lower the seat by pivotal movement around hinge pin 13. The fluid damper 21 is pressurized during the lowering movement of the seat. When the seat has been lowered, it is moved forwardly so that pins 37 on grip arms 31 are engaged in grooves 39 of receiver members 38. The seat is now held in its lowered position. One or more helmets 47 can then be placed on arm 33 which is outwardly pivoted around pin 34. The arms 33 are then pivoted inwardly and the locking mechanisms 35 are actuated whereby the arms 33 are secured to receivers 44 and thereby to frame 1. The lock 43 is then operated to lock the respective arm to the frame.

To raise the seat, lock 43 is unlocked and activating levers 42 are rotated to bring the locking members 41 to the unlocked position. The arms 33 are then pivoted outwardly and any helmets which have been secured can be removed. The seat is then urged rearwardly by applying force to grip member 28 to move hinge pin 13 to the rear of slot 14 and free pins 37 of the holding mechanism from slots 39. The seat is now free to be pivoted upwardly with the assistance of damper 21.

The sidewalls 27 of cover 26 are connected at their rear ends to form an integral rear cowl 48 which covers bottom plate 16 at the underside of seat 5. The rear cowl 48 partially encloses a tail light 49 and rear directional lights 50 secured to fender 20. Since the seat is moved rearwardly in order to be placed in its open position, the rear cowl 48 can be brought flush with the lights without interference during opening and closing movements.

The seat 5 is provided, at the front thereof, with forwardly projecting extensions 51 at opposite lateral sides of the seat. The extensions 51 are engaged in recesses or cavities 52 in the sides of fuel tank 6 when the seat is in its lowered position as shown in FIGS. 14 and 15. The extensions 51 are recieved in the cavities 52 such that they lie flush with the outer surface of fuel tank 6. The extensions 51 are shaped and dimensioned as seen in FIG. 15 to extend from the thighs of the driver along the bend of the driver's knees. In this way, the driver does not grip the fuel tank directly by his knees, but rather grips the extensions 51. The extensions are relatively flexible and vibrations of the vehicle are absorbed by the extensions thereby to improve contact with the knees and provide better gripping properties. The gripping of the rigid walls of the fuel tank in the conventional construction is obviated by the provision of the extensions 51 on the seat.

Figure 12:
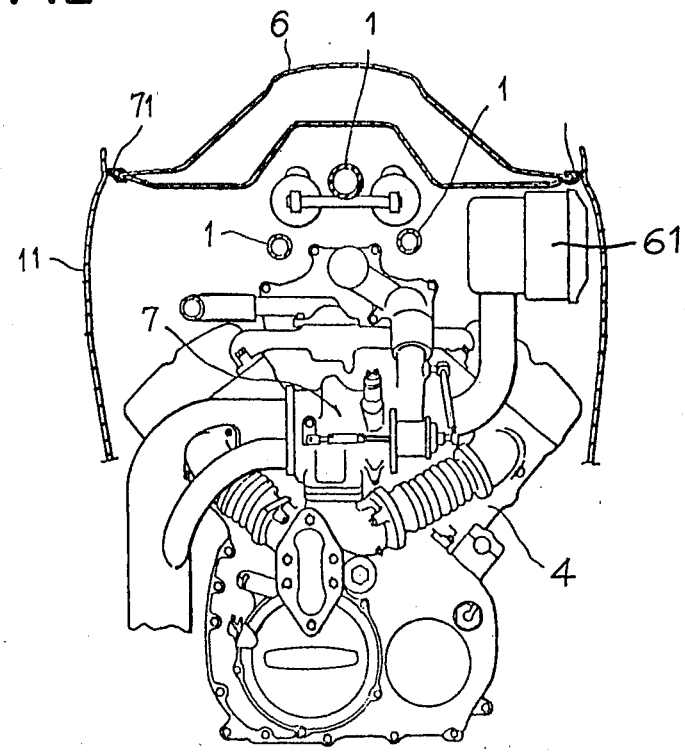
FIG. 12 is a front view of the structure illustrated in FIG. 11 with a portion removed.
Figure 13:
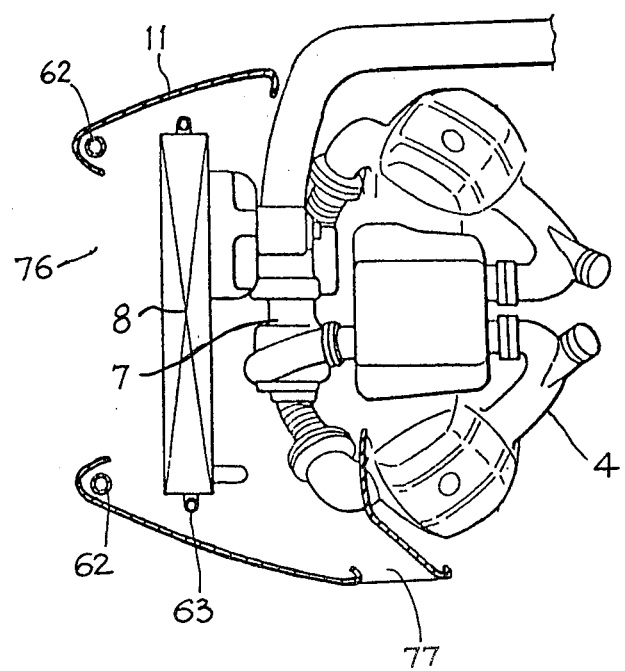
FIG. 13 is a top plan view of the structure illustrated in FIG. 11.

Behind the engine 4 are various additional parts of the motorcycle including fuel valve 53, fuel pump 54, fuel filler 55, fuel delivering pipe 56, fuel filter 57, return pipe 58, injector 59 and a control unit 60 containing various electrical parts. These additional elements will become accessible for inspection or replacement when the seat is raised. Other accessible parts not shown or described include a battery, generator, regulators, rectifier etc. Located in front of the engine is an air cleaner 61 (FIG. 12).

The front fairing 11 defines an inner space S in which are enclosed the radiator 8, supercharger 7 and a portion of engine 4. The fairing 11 is secured by a stay 62 extending upwardly from a retaining frame 63 which also supports the radiator. A pair of headlights 64 are exposed at the front of fairing 11 and are mounted on support bracket 65. An oil cooler 66 is mounted on the bottom of bracket 65 and a gauge assembly 67 is mounted above the bracket 65. A windshield 68 extends upwardly from the upper edge of fairing 11.

In further accordance with the invention, a top cover 69 extends above the space S enclosed by the fairing 11, and is located above the head pipe 9. The cover 69 extends between the fairing 11 in the front and the fuel tank 6 in the rear. The cover 69 is attached in airtight fashion to the fuel tank 6 by a rubber seal 70 at its rear edge and is similarly attached to the fairing 11 by a rubber seal 71 at its front edge. Thereby, the cover 69 is in a fixed state between the fuel tank 6 and the fairing 11. The cover 69 is provided with escape holes 72 allowing the passage of the handle pipes 10 through their maximum angle of operative travel. Each escape hole is closed in airtight fashion by a flexible boot 73 provided between the respective hole 72 and handle pipe 10. The cover 69 is composed of an opaque metal or plastic sheet to conceal the contents in space 74 which can include, for example, a combination switch 75 and air cleaner 61. The enclosed space S provided below cover 69 now becomes available for free use, for example, as a resonance chamber, to operate in association with the supercharger 7 or for various electrical parts in addition thereto.

The space S, closed at the top by cover 69, has a cooling air inlet 76 at the front, and to guide cooling air introduced therethrough to the rear, a side duct 77 is provided on the side at the rear of fairing 11. Furthermore, the upper portion of fairing 11, connected to the windshield 68, constitutes a bonnet in which a hood 78 is provided to open upwardly for inspection of the interior of space S.

The cover 69 serves the main purpose of closing the space S from above to block air flowing from the space rearwardly towards the driver on the seat while also enabling the upper portion of space S to be utilized for various parts as desired.

The invention has been described above in conjunction with various embodiments thereof. It will become apparent to those skilled in the art that numerous modifications and variations can be made without departing from the scope and spirit of the invention as defined in the attached claims.

What is claimed is:

1. In a motorcycle having a frame, front and rear wheels on said frame, an engine between said wheels, and a driver's seat on said frame, the improvement comprising coupling means between said seat and said frame for providing pivotal movement of said seat between a raised inoperative position and a lowered operative position, resilient means for urging said seat to said raised position, releasable holding means for holding the seat in said lowered position, said coupling means including a hinge on said seat, said frame including a guide means movably receiving said hinge for travel between a first forward position and a second rearward position, said seat being held by said releasable holding means with said hinge in said first position and being released from said holding means with said hinge moved to said second position whereupon said resilient means moves said seat to said raised position whereby said seat is raised only after the hinge has been moved in said guide means to said second position.

2. The improvement as claimed in claim 1, wherein said releasable holding means comprises a pin and groove connection, said pin being released from said groove with said hinge in said second position.

3. The improvement as claimed in claim 1, wherein said resilient means comprises a fluid cylinder.

4. The improvement as claimed in claim 3, wherein said fluid cylinder comprises a piston member and a cylinder member slidably receiving said piston, one of said members being pivotably connected to said frame, the other member being pivotably connected to said seat.

5. The improvement as claimed in claim 4, wherein said fluid cylinder is pneumatically operated and is pressurized when the seat is brought to its lowered operative position.

6. The improvement as claimed in claim 1 comprising a depending cover secured to said seat and including lateral side portions, said cover being movable with said seat between said raised and lowered positions, said side portions of the cover covering said frame at laterally opposite sides thereof with said seat in said lowered position.

7. The improvement as claimed in claim 6, wherein said cover further includes a connecting portion joining said lateral side portions to form a rear cowl which is pivotably moved with said seat.

8. The improvement as claimed in claim 7, said motorcycle having rear lights at least partially enclosed by said rear cowl, said seat being in lowered operative position with the hinge in the forward position and being raised with the hinge in rearward position and said rear cowl spaced rearwardly from said rear lights.

9. The improvement as claimed in claim 8, wherein said hinge includes a laterally extending hinge pin and longitudinal grooves slidably and rotatably supporting said hinge pin.

10. The improvement as claimed in claim 9, wherein said hinge pin is fixed to said seat and said longitudinal grooves are provided in said frame.

11. The improvement as claimed in claim 1, said motorcycle further having a fuel tank in front of seat supported by said frame, the improvement further comprising forwardly projecting extensions at opposite sides of said seat for flanking said fuel tank for contact by the knees of a driver.

12. The improvement as claimed in claim 11 comprising a depending cover secured to said seat, said cover being movable with said seat between said raised and lowered positions, said extensions projecting forwardly of said cover.

13. The improvement as claimed in claim 12, wherein said fuel tank has lateral cavities, said extensions being received in said cavities with said seat in lowered position, said extensions being flush with the contour of the fuel tank when received in said cavities.

14. In a motorcycle having a frame, front and rear wheels on said frame, an engine between said wheels, and a driver's seat on said frame, the improvement comprising coupling means between said seat and said frame for providing pivotal movement of said seat between a raised inoperative position and a lowered operative position, resilient means for urging said seat to raised position, a depending cover secured to said seat and including lateral side portions, grip means encircling said seat at the rear thereof, means connecting said grip means to said cover and thereby to said seat, and holding means on said frame for releasably holding the cover at said connecting means with the grip means.

15. The improvement as claimed in claim 14, wherein said coupling means includes a hinge on said frame movable between a first position in which the seat is held by said holding means, and a second position in which said seat is released from said holding means, said connecting means and holding means cooperatively including a pin and groove connection.

16. The improvement as claimed in claim 15, wherein said connecting means comprises fastener means connecting said grip means to said cover, said pin of said pin and groove connection being integral with said fastener means, said holding means comprising a receiver secured to said frame, said receiver being provided with said groove of said pin and groove connection, said pin being insertable into and removable from said groove during movement of said hinge to said first and second positions respectively.

17. The improvement as claimed in claim 16, wherein said holding means and connecting means are located at both side portions of said cover.

18. In a motorcycle having a frame, front and rear wheels on said frame, an engine between said wheels, and a driver's seat on said frame, the improvement comprising coupling means between said seat and said frame for providing pivotal movement of said seat between a raised inoperative position and a lowered operative position, resilient means for urging said seat to said raised position, locking means for locking said seat in said lowered operative position, and grip means secured to said seat and encircling said seat at the rear thereof, said locking means including an engaging member supported by said grip means for releasably engaging said frame and a lock for locking said engaging member with said frame.

19. The improvement as claimed in claim 18, wherein said engaging member is movable between engaged and disengaged positions with said frame.

20. The improvement as claimed in claim 19, wherein said engaging member is turnable between said engaged and disengaged positions.

21. The improvement as claimed in claim 19, wherein said grip means includes a rear portion fixed to said seat and a pair of arms connected to said rear portion on opposite sides of said seat for pivotable movement towards and away from said seat, said arms each supporting one said engaging member, at least one arm being provided with said lock.

22. The improvement as claimed in claim 21 comprising an actuating lever on each said engaging member for moving said engaging member between engaged and disengaged positions.

23. The improvement as claimed in claim 2, wherein said arm is dimensioned and proportioned to hold a helmet thereon such that with the arm locked to the frame, the helmet is secured to the arm.

24. The improvement as claimed in claim 21, wherein said rear portion of said grip means is U-shaped.

25. In a motorcycle having a frame, front and rear wheels on said frame, an engine between said wheels, and a driver's seat on said frame, the improvement comprising coupling means between said seat and said frame for providing pivotal movement of said seat between a raised inoperative position and a lowered operative position, resilient means for urging said seat to said raised position, said motorcycle further having a fuel tank in front of said seat, a head pipe in front of said fuel tank with left and right handle pipes projecting from the top of said head pipe, and a fairing secured to said frame and laterally enclosing a space in front of the seat through which the head pipe and left and right handle pipes pass, the improvement further comprising a head cover covering said space from above, said head cover being disposed above said head pipe, between said fairing and said fuel tank, for blocking air from flowing from said space.

26. The improvement as claimed in claim 25 comprising sealing means on said head cover for sealing the head cover with said fairing and said fuel tank.

27. The improvement as claimed in claim 25, wherein said head cover is provided with holes for passage of said left and right handle pipes and a flexible boot between said handle pipes and said head cover to form an air-tight seal thereat.

28. A method of operating a seat of a motorcycle to lift the seat to an opened position to gain access to equipment beneath the seat and to lower the seat to operative position, said method comprising longitudinally displacing the seat rearwardly to a release position in which the seat can be lifted to open position, applying the force of an energized member to the seat to lift the seat when it is in said rearward release position, energizing said member by the lowering of the seat from its opened position and displacing the seat longitudinally forwardly to hold the seat in lowered position with said member energized and in readiness to apply lift force to the seat in a subsequent opening operation.

29. A method as claimed in claim 28, wherein the energizing of said member comprises compressing a fluid.

30. A method as claimed in claim 28 comprising locking said seat in said lowered position after the seat has been moved forwardly and is held in said lowered position.

31. A method as claimed in claim 30 comprising securing a helmet to said seat upon locking said seat.

32. A method as claimed in claim 28 comprising blocking air from rising in a space in front of said seat.

33. A method as claimed in claim 28 comprising providing knee supports on the seat which flank a fuel tank in front of the seat when the seat is lowered thereby blocking contact of the knees of the driver with the fuel tank.

* * * * *